Aug. 23, 1949.  K. A. E. LUOMALA  2,479,753
RAKE TEETH AND MOUNTING THEREFOR
Filed Feb. 18, 1946
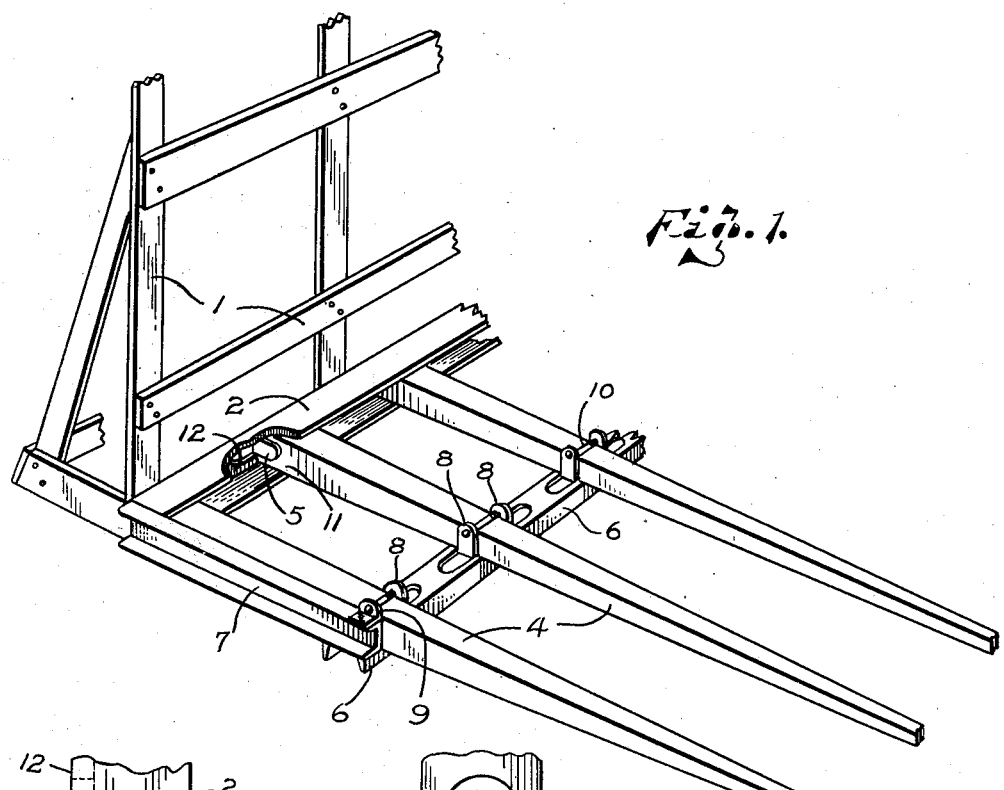
Fig. 1.
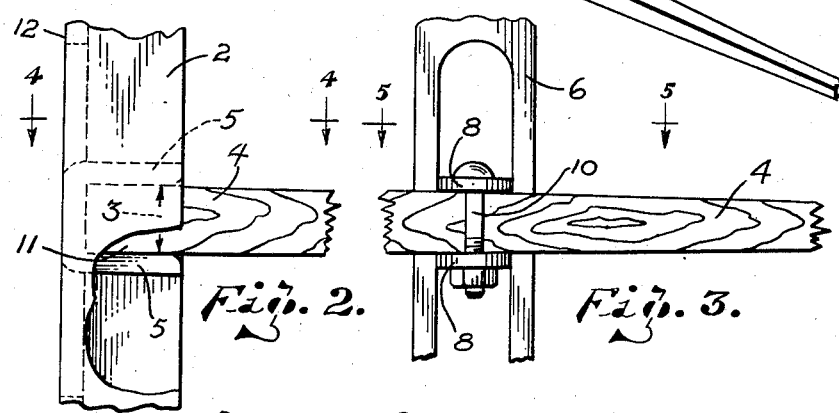
Fig. 2.   Fig. 3.
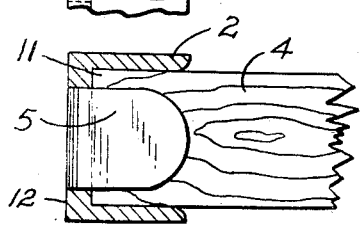   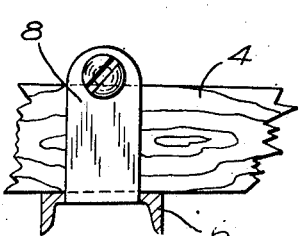
Fig. 4.   Fig. 5.
INVENTOR.
K. A. E. Luomala.
BY
Geo Stevens
atty.

Patented Aug. 23, 1949

2,479,753

UNITED STATES PATENT OFFICE 2,479,753

RAKE TEETH AND MOUNTING THEREFOR

Karl A. E. Luomala, Cloquet, Minn.

Application February 18, 1946, Serial No. 648,339

3 Claims. (Cl. 56—400)

This invention relates to sweep rakes and particularly to a specific type of tooth and assembly therefor.

The principal objects sought are simplicity, most ready and simple method of installation or renewal and inexpensiveness.

Other advantageous features may appear in the further description of the invention.

Referring now to the drawings forming part of this application and in which like reference numerals indicate like parts:

Fig. 1 is a perspective view of the fragmental rearmost portion of a sweep rake, the teeth of which as shown are assembled within the head frame portion in accordance with the invention.

Fig. 2 is an enlarged fragmental top plan view of the union of one of the teeth with the head frame base member.

Fig. 3 is a similar view of the union of a tooth with the outer supporting cross members.

Fig. 4 is a cross sectional view taken on the line 4—4, Fig. 2.

Fig. 5 is a similar view on the line 5—5, Fig. 3.

The frame-like upright fabricated structure indicated at 1 represents what is known as the head frame or fence of a common sweep rake and may vary considerably in setup, it having no material relation to the invention except that the base and major member 2 thereof is provided with suitable seats or sockets 3 spaced longitudinally thereof, one for reception of the butt or head end 11 of each tooth 4.

These teeth are usually of good quality, well seasoned hard wood, possibly eight feet or so long and the total width of rake from ten to sixteen feet wide, thus requiring a quite staunch assembly for maintenance of same.

Thus I prefer to use as a most convenient and strong base head member 2, a suitable channel iron as shown, the web 12 of which has punched therefrom and extending into the open face thereof a plurality of pairs of spaced wing-like members 5—5, each pair of which forms therebetween an independent seat or socket indicated at 3 for reception of the butt or larger end of each tooth 4.

These wing-like members or lugs are of less width than the web of the channel so as to avoid forming tight walls upon opposite sides of each socket where trash or dirt of any sort might otherwise clog the free entrance of the butt ends of the teeth.

Spaced a suitable distance forwardly of and parallel with the head channel 2, is a like but slightly smaller and longer channel iron member 6 which forms the forward support for the rake teeth, it being supported from the opposite ends of the head channel 2 by similar, but shorter channel iron supports 7 (only one illustrated), these being welded or otherwise suitably attached at their ends to the head channel 2 and at their opposite ends to the opposite ends of the member 6 as clearly obvious from the drawing.

This member 6 is disposed with the channel face downwardly and its web upwardly for the rake teeth 4 to rest upon, has punched upwardly from the web thereof a plurality of spaced pairs of lugs or wings 8—8 as guides and holding means for each tooth 4, except at the extreme ends thereof where an auxiliary lug 9 is provided to match its adjacent single lug 8 as the latter's like mate is dispensed with due to the fixed presence of the channel 7 forming one side wall for the adjacent side tooth 4.

The lugs 8, of course, must be spaced to neatly fit that part of the tapered tooth 4 which it is designed to hold in place when the butt end of the tooth is in its respective base seat in the head member 2, and through the upper ends of each pair of lugs 8 is installed a suitable closing means for the open ends of said lugs 8 such as a pin 10 held therein as by having one end threaded within one of the lugs, or extending wholly therethrough for application of a nut, the opposite end having a suitable head in either event, or even a simple spring cotter pin may be made to function equally well.

From the above, it is thought apparent that this type of tooth assembly is very simple and by the removal of one of the pins or cotter, if the latter is used, a tooth may readily be installed or removed as desired and when in place in the rake head as shown are exceptionally free from annoyance in their general manipulation or danger of working loose.

What I claim is:

1. In a sweep rake having a head frame, a channel iron base member transverse said frame, the flanges of said channel projecting forwardly of said frame, a plurality of pairs of lugs extending from the web of said base member intermediate of the flanges thereof, each pair of lugs forming a socket in conjunction with the flanges of said channel iron base member, supports projecting forwardly from said base member, a forward supporting member fixed to and carried by said supports in substantially parallel relation to said base member, a plurality of pairs of lugs extending from said forward supporting members and being aligned with said sockets, and a plurality of elongated tapered rake teeth having their larger ends supported within said sockets and an intermediate portion thereof removably held by said pairs of lugs on said forward supporting member to maintain said teeth in place on said rake, each pair of said lugs being spaced apart substantially the width of that portion of the respective tooth engaged thereby.

2. The rake as set forth in claim 1 further characterized by having means for closing the open ends of each of said pairs of lugs which extend from said forward supporting members to hold the respective teeth therewithin.

3. A sweep rake having a head frame, a base member transversely of the bottom of said frame, sockets spaced longitudinally of said base member, supports projecting forwardly from each end of said base member, a supporting member parallel with and spaced from said base member and connecting the forward end of each support, a plurality of spaced lugs extending from said supporting member, each pair being aligned with one of said sockets, a plurality of spaced tapered rake teeth, each supported intermediate its ends between a pair of said lugs and removably secured thereto with the larger end of said rake teeth each supported within a socket, said lugs being spaced apart substantially the width of that portion of the respective teeth instantly engaged thereby.

KARL A. E. LUOMALA.

REFERENCES CITED

The following references are of record in the file of this patent:

UNITED STATES PATENTS

| Number | Name | Date |
| --- | --- | --- |
| 489,672 | Gibbs | Jan. 10, 1893 |
| 663,288 | Mason | Dec. 4, 1900 |
| 1,133,138 | Henderson | Mar. 23, 1915 |
| 2,238,840 | Weishaar | Apr. 15, 1941 |